March 1, 1966     P. DAVIS ETAL     3,237,834
LAMINATED CONTAINER AND METHOD OF MAKING THE SAME
Filed July 29, 1963     2 Sheets-Sheet 1

INVENTORS
PAUL DAVIS
DAVID F. STEWART
BY ANDRÉ F. COMMEYRAS
JAMES C. WHITE

*Ezekiel Wolf, Wolf & Greenfield*
ATTORNEYS

March 1, 1966  P. DAVIS ETAL  3,237,834
LAMINATED CONTAINER AND METHOD OF MAKING THE SAME
Filed July 29, 1963                                          2 Sheets-Sheet 2
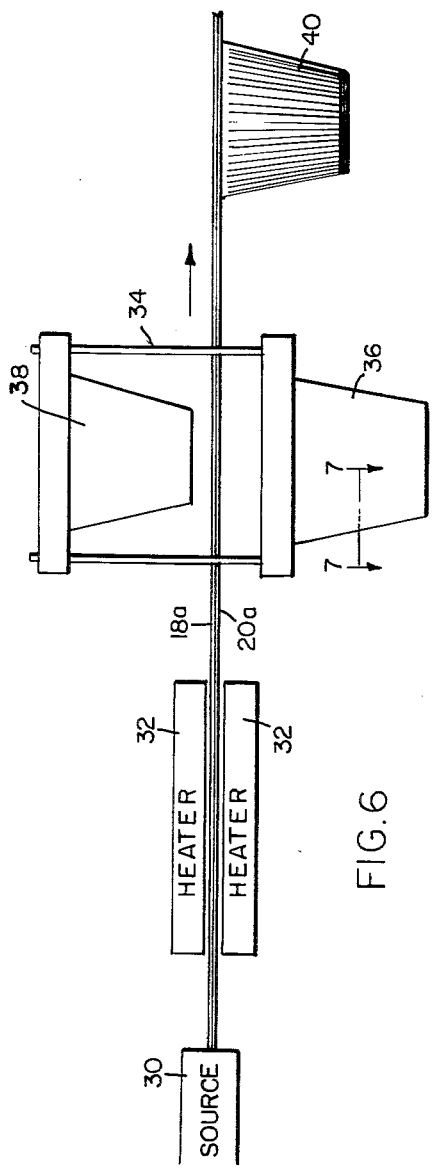
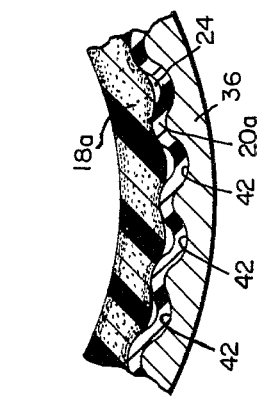
INVENTORS
PAUL DAVIS,
DAVID F. STEWART
BY ANDRÉ F. COMMEYRAS
JAMES C. WHITE
ATTORNEYS United States Patent Office 3,237,834
Patented Mar. 1, 1966

3,237,834
LAMINATED CONTAINER AND METHOD OF MAKING THE SAME
Paul Davis, Beverly, David F. Stewart, North Reading, Andre F. Commeyras, Concord, and James C. White, Lynnfield, Mass., assignors to Sweetheart Plastics, Inc., Wilmington, Mass., a corporation of Maryland
Filed July 29, 1963, Ser. No. 298,317
2 Claims. (Cl. 229—1.5)

This invention relates to disposable containers and more particularly comprises a new laminated container having improved insulating properties.

Disposable plastic containers for food and drink are fast taking over the market of their paper counterparts, but considerable difficulty has thus far been encountered in the development of a satisfactory disposable plastic cup for hot drinks, and none have been marketed which are truly competitive with the paper product. Foamed plastics have logically been called upon to provide the necessary insulation to enable a plastic container for hot liquids to be handled comfortably. While foamed plastics have the necessary insulating properties they lack the necessary strength, and most recently experiments have been performed with foam-film laminates, utilizing the foam for insulation and the film for structural integrity. Two related problems encountered in the use of foam for containers still remain unsolved; namely, during forming the foam is somewhat compressed and accordingly loses some of its insulating qualities, and to compensate for this loss, greater amounts of foam are used. The increase in the amount of foam raises material costs and places the plastic product at a price disadvantage with respect to paper.

One important object of this invention is to increase the insulating properties of a laminated container without increasing the amount of material used.

Another important object of this invention is to provide a laminated container having a textured surface which not only favorably contributes to the appearance of the container, but performs functionally as well to improve its insulating properties.

Yet another important object of this invention is to provide an improved method of forming a plastic container which method without increased cost provides a better product.

To accomplish these and other objects, this invention includes among its features a container having side and bottom walls formed from a sheet of laminated material having one ply which is more formable than the other. Protuberances are formed in the more formable ply extending away from the other ply so as to define air pockets beneath the inner surface of the more formable ply, which pockets enhance the insulating properties of the container walls. To form the protuberances, the forming die contacts the more formable ply of the laminated sheet stock, and the die is provided with cavities having area and depth dimensions so selected that the more formable material will conform to the shape of the cavities while the other material will not readily follow the contours of the die. Because the more formable material closely follows the contours provided while the other sheet of the laminate does not, the air pockets are formed which contribute to the insulation. While the pockets may be formed throughout the side walls of the container, they are most advantageous at the areas normally grasped by the user during the normal handling of the container.

These and other objects and features of this invention along with its incident advantages will be better understood and appreciated from the following detailed description of several embodiments thereof, selected for purpose of illustration and shown in the accompanying drawing, in which:

FIG. 6 is a diagrammatic view illustrating a method in which the containers of FIGS. 1–5 may be formed; and, FIG. 7 is a fragmentary detail of a portion of a die employed in the forming of the containers.

Figure 1:
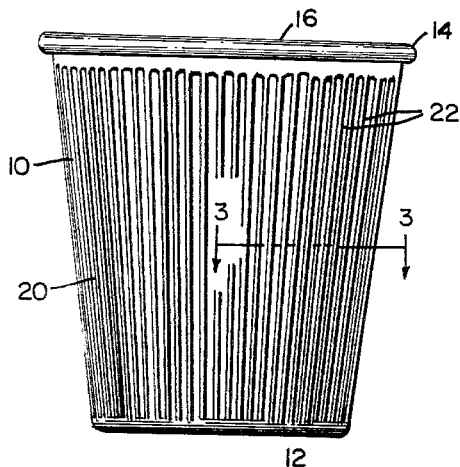
FIG. 1 is a side view of a container constructed in accordance with this invention.
Figure 3:
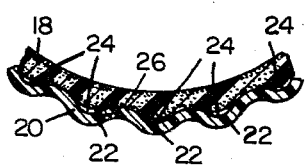
FIG. 3 is a cross-sectional view taken along the section line 3—3 of FIG. 1.
Figure 2:
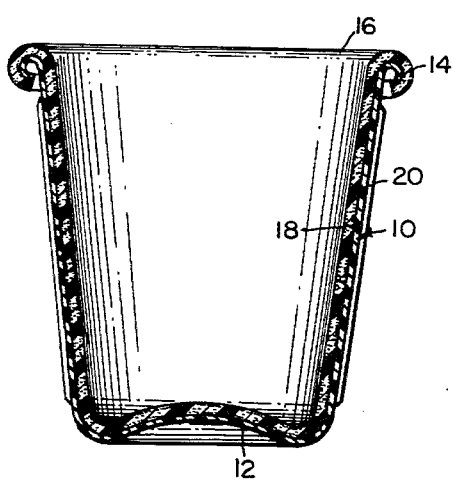
FIG. 2 is a cross-sectional view in a vertical plane of the cup shown in FIG. 1.

In FIG. 1 this invention is shown embodied in a drinking cup designed for hot liquids such as coffee, but it is to be understood that the invention is not limited to drinking cups and may be embodied in many other forms of containers. The cup shown in FIG. 1 is of simple design having a generally cylindrical but slightly tapered side wall 10, a bottom wall 12 and a rim 14 about its mouth 16. The particular taper and general shape of the container form no part of the present invention. As shown in FIGS. 2 and 3, the container is formed from a two ply plastic material with the inner ply 18 being of a foamed plastic and the other ply 20 being a denser film. Typically the plastic plies 18 and 20 may be made of polystyrene. The foam layer 18 provides a substantial portion of the total insulating property of the side wall 10, while the film 20 lends considerable strength to it.

The outer ply or layer 20 of the side wall 10 is provided with a series of closely spaced ribs or protuberances 22 which extend outwardly and away from the inner ply 18 of the wall. The protuberances 22 while shown to be in the form of ribs extending generally vertically about the entire side wall 10 from adjacent the bottom wall 12 to the rim 14, may be horizontally or diagonally oriented and may intersect one another on the cup surface. Alternatively, the protuberances need not be formed as ribs at all, but rather may take the form of dimples or bumps of any shape provided over the area of the side wall. As shown in FIG. 3, the protuberances 22 formed in the outer ply 20 define air pockets 24 between the two plies as the surface 26 of the foam ply 18 does not exactly follow the contours of the film ply 20. Thus, while some protrusions are shown formed in the outer surface 26 of the foam ply 18, the protrusions in the foam are not as pronounced as those in the film and the air pockets 24 result. The air pockets 24 extending over the area of the side wall 10 obviously contribute a substantial degree of insulation to the side wall 10. It should be noted that the inner surface of the foam may have slight convolutions which reflect the shape of the outer surface.

The foam layer 18 typically may have a thickness of approximately .040–.060 inch, while the film thickness may be approximately .012–.015 inch. The ribs or protuberances in the film may most conveniently be formed during the forming of the container itself, and this is possible if the container is either pressure or vacuum formed, with or without a plug assist. Furthermore, the two plies of the container material may or may not be fused together prior to the forming of the container. While the resulting product may differ somewhat depending upon whether the material is previously fused or not, the resulting products will both have improved insulating properties. These differences will be made clear below in connection with the embodiment shown in FIG. 4, after the method of manufacture suggested in FIGS. 6 and 7 is described.

In FIG. 6 a source 30 shown in box form provides the two layers of material 18a and 20a comprising the foam and film plastic layers. The source 30 may represent a combined foam sheet extruder, film source and laminating machine, or may merely represent separate rolls of film and foam and a nip roll assembly for bringing the sheets together. The sheets 18a and 20a are passed between heaters 32 which establish the foam and film sheets at the forming temperature. The heaters 32 may not be necessary if the source 30 includes the extruders, as the heat of extrusion of either or both of the plies may be sufficient to maintain the sheets at the formable temperature without supplemental heating. Thereafter the two sheets are passed through the forming assembly 34 which in the embodiment shown includes a female die 36 and plug assist 38. An actuating source (not shown) is connected to the forming assembly to actuate the plug assist 38 and provide the pressure and/or vacuum to the sheets 18a and 20a so that they follow the contours of the inner surface of the female die 36. As a result a cup 40 is suggested in FIG. 6 having been formed in the sheets by the assembly 34.

The inner surface of the female die 36 is shown in FIG. 7 to be provided with a series of closely spaced cavities 42 into which the sheets are drawn at least in part during the forming operation. The cavities 42 have a depth to width ratio which inhibits the flow of the foam layer 18a into the cavities while allowing the film layer 20a to pass into them and conform to their inner surfaces. By the proper selection of a depth to width ratio of the cavities this may readily be achieved. This is true because the foam layer 18a is a colder material than the film; that is, it is formed at a lower temperature than the film to avoid rupture of the cell walls, and of course at the lower temperature the foam ply is less formable. Furthermore, because the film layer 20a is appreciably thinner than the foam layer, the film may more readily follow the contours of the inner surface of the female die 36. The internal forces of the foam which prevent it from following the inner surface of the die and more particularly the cavities 42, serve to pull the foam away from the film and form the air pockets 24.

As indicated above, the foam and film layers may or may not be fused together before the actual forming of the container. The embodiment shown in FIGS. 1–3 and the illustration of FIG. 7 suggest that the two sheets were not previously fused but rather were bonded together as the initial stage of forming the containers. The heaters 32 could be used to supply the heat for bonding, or bonding could be achieved at the source 30 by passing the two sheets between nip rolls at the extruder. When this procedure is followed the air pockets 24 are more likely to form between the two layers 18a and 20a rather than in the interior of one of the layers.

Figure 4:
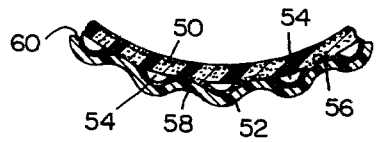
FIG. 4 is a cross-sectional view similar to FIG. 3, but showing another embodiment of this invention.

In FIG. 4 a slightly different embodiment is shown wherein the walls of the container are composed of a foam layer 50 and a film layer 52, and the air pokets 54 lie within the layer of foam and not between the two layers. That is, the air pockets 54 are shown disposed appreciably beneath the inner surface 56 of the film layer 52. This configuration suggests that the layers of foam and film were bonded together prior to forming.

When the layers are laminated, a density gradient may be created across the cross section of the foam wherein the density of the foam is maximum adjacent its outer surfaces and minimum within its interior. In this case, when the material is pressure or vacuum drawn into the female die 36, the outer surface 58 of the laminate may follow the contours of the cavities 42 provided in the die, and because the material has previously been bonded together no delamination may occur. Rather, some fracturing of the foam layer may occur imediately behind the outer region 60 of greater density. That is, the bond between the relatively dense foam layer and the film may exceed the strength of the less dense region of the foam, and the parting may occur as suggested in FIG. 4 beneath the surface of the foam, rather than between the two layers.

Figure 5:
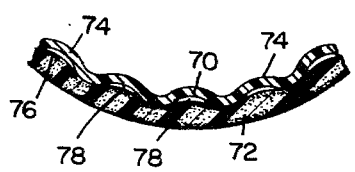
FIG. 5 is a cross-sectional view similar to FIGS. 3 and 4, and showing yet another embodiment of this invention.

In FIG. 5 still another embodiment of this invention is suggested. While in the previously described embodiments the two ply container side wall has an inner foam layer and an outer layer of film, in FIG. 5 the opposite condition exists; namely, the film layer 70 lies on the inner side of the wall and the outer layer 72 is composed of a foam material. In FIG. 3 the film layer 70 is shown to have a series of closely spaced inwardly extending protuberances 74 which define between the film and the outer surface 76 of the foam air pockets 78 to provide increased insulation. The embodiments of FIG. 5 may most readily be made by male forming the container as opposed to the female forming suggested for the embodiments of FIGS. 3 and 4. Thus, by using a male die and vacuum or pressure forming about it and providing the outer surface of the male die with cavities virtually identical to the cavities 42 shown in the female die 36 of FIG. 7, the protuberances 74 may be formed, and the foam layer 72 may because of the width to depth ratio of the cavities be prevented from following the cavity contours. The foam and the film layers may or may not be previously fused. The outer surface of the foam may have slight convolutions reflecting the inner surface of the foam ply.

In the several embodiments shown and described, the containers have been made of a two ply foam-film laminate. It will of course be understood that in the embodiments of FIGS. 3 and 4, a third layer of film or other material could be applied to the inner surface of the foam layers 18 and 50, respectively, without affecting the product or the method in which it may be fabricated. Similarly, a third layer could be applied to the outer surface of the foam in the embodiment of FIG. 5. The formation of the products remains dependent upon the difference in formability between the film and the foam layers and the cavities provided in the forming die. It will also be understood that while the foam-film plastic laminate of polystyrene is suggested, and perhaps because of economic and other considerations it is the most practical material to use, other formable materials may be used.

Further, the size of the air pockets is not critical, except that greater insulation is of course derived from larger pockets. To enhance significantly the insulation of the side walls the pockets should be appreciably larger than the normal cells of the foam.

Having described this invention in detail numerous modifications will occur to those skilled in the art. Therefore, it is not intended that the breadth of this invention be limited to the specific embodiments illustrated and described. Rather, it is intended that the breadth of this invention be determined by the appended claims and their equivalents.

What is claimed is:

1. An insulated food container comprising a side wall made of foam film laminated plastic material with the inner ply of the material being foamed plastic and the outer ply being film, said foam and film plies being bonded together over facing surfaces, said inner foam ply having increasing density across a portion of its cross-section with a relatively high density portion of said foam facing and bonded to said film ply, protuberances provided in the film and in corresponding underlying areas of said foam, and air-pockets defined within said foam ply underlying and co-extensive with said protuberances.

2. An insulated food container in accordance with claim 1 wherein said film ply is in the range of .012 to .015 inch in thickness and said foam ply is in the range of .040 to .060 inch in thickness.

References Cited by the Examiner
UNITED STATES PATENTS

| | | | |
|---|---|---|---|
| 2,996,764 | 10/1961 | Ross et al. | 264—241 |
| 3,049,277 | 8/1962 | Shappell | 229—1.5 |
| 3,070,253 | 12/1962 | Brown | 220—9 |
| 3,082,484 | 3/1963 | Sherman | 264—241 |
| 3,082,900 | 3/1963 | Goodman | 229—1.5 |
| 3,128,029 | 4/1964 | Price et al. | 229—1.5 |
| 3,131,845 | 5/1964 | Sherlock et al. | 229—1.5 |

GEORGE O. RALSTON, *Primary Examiner.*

FRANKLIN T. GARRETT, THERON E. CONDON,
*Examiners.*